(12) United States Patent
Salentiny et al.

(10) Patent No.: US 10,049,583 B2
(45) Date of Patent: Aug. 14, 2018

(54) FLIGHT CONDITION EVALUATION AND PROTECTION FOR UNMANNED AERIAL VEHICLES AND REMOTELY-PILOTED VEHICLES

(71) Applicant: ITERIS, INC., Santa Ana, CA (US)

(72) Inventors: Dustin M. Salentiny, Grand Forks, ND (US); John J. Mewes, Mayville, ND (US)

(73) Assignee: CLEARAG, INC., Santa Ana, CA (US)

( * ) Notice: Subject to any disclaimer, the term of this patent is extended or adjusted under 35 U.S.C. 154(b) by 0 days.

(21) Appl. No.: 15/012,479

(22) Filed: Feb. 1, 2016

(65) Prior Publication Data

US 2016/0260331 A1    Sep. 8, 2016

Related U.S. Application Data

(60) Provisional application No. 62/110,580, filed on Feb. 1, 2015.

(51) Int. Cl.
| | |
|---|---|
| *G08G 5/02* | (2006.01) |
| *G08G 5/00* | (2006.01) |
| *B64C 39/02* | (2006.01) |
| *G05D 1/00* | (2006.01) |
| *G05D 1/10* | (2006.01) |

(52) U.S. Cl.
CPC ......... *G08G 5/0034* (2013.01); *B64C 39/024* (2013.01); *G05D 1/0061* (2013.01); *G08G 5/003* (2013.01); *G08G 5/0013* (2013.01); *G08G 5/0039* (2013.01); *G08G 5/0069* (2013.01); *G08G 5/0091* (2013.01); *B64C 2201/141* (2013.01); *B64C 2201/146* (2013.01); *G05D 1/00* (2013.01); *G05D 1/104* (2013.01)

(58) Field of Classification Search
None
See application file for complete search history.

(56) References Cited

U.S. PATENT DOCUMENTS

| | | | |
|---|---|---|---|
| 8,000,847 B2 | 8/2011 | Shue | |
| 9,311,760 B2 | 4/2016 | Downey et al. | |
| 2009/0204277 A1* | 8/2009 | Coulmeau | G01C 23/00 701/3 |
| 2014/0142787 A1 | 5/2014 | Tillotson et al. | |

(Continued)

*Primary Examiner* — John Olszewski
*Assistant Examiner* — Gerrad A Foster
(74) *Attorney, Agent, or Firm* — Lazaris IP

(57) ABSTRACT

A framework for combining a weather risk analysis with appropriate operational rules includes a data initialization component, a rules processing component, and one or more weather risk analysis and assessment tools to evaluate a flight condition. The framework applies current, historical, predicted and forecasted weather data to the one or more operational rules governing a mission, a payload, a flight plan, a craft type, and a location of the mission for aircraft such as an unmanned aerial vehicle or remotely-piloted vehicle, and generates advisories based on the evaluation of flight conditions such as a mission compliance status, instructions for operation of unmanned aircraft, and management advisories. The flight condition advisories include either a "fly" advisory or a "no-fly" advisory, and the framework may also provide a mission prioritization and optimization system.

23 Claims, 2 Drawing Sheets

(56) References Cited

U.S. PATENT DOCUMENTS

| | | |
|---|---|---|
| 2015/0234387 A1 | 8/2015 | Mullan et al. |
| 2015/0298654 A1* | 10/2015 | Joao ............... G01S 19/13 701/2 |
| 2015/0379874 A1* | 12/2015 | Ubhi ............... G01S 5/0027 701/3 |
| 2016/0111006 A1 | 4/2016 | Srivastava et al. |
| 2016/0116912 A1* | 4/2016 | Nehmadi ............ G05D 1/0022 701/2 |
| 2016/0140851 A1 | 5/2016 | Levy et al. |
| 2016/0216711 A1 | 7/2016 | Srivastava et al. |
| 2016/0225263 A1 | 8/2016 | Salentiny et al. |

* cited by examiner

FLIGHT CONDITION EVALUATION AND PROTECTION FOR UNMANNED AERIAL VEHICLES AND REMOTELY-PILOTED VEHICLES

CROSS-REFERENCE TO RELATED PATENT APPLICATION(S)

This patent application claims priority to U.S. provisional application 62/110,580, filed on Feb. 1, 2015, the contents of which are incorporated in their entirety herein. In accordance with 37 C.F.R. § 1.76, a claim of priority is included in an Application Data Sheet filed concurrently herewith.

FIELD OF THE INVENTION

The present invention relates to unmanned aircraft systems, such as unmanned aerial vehicles and remotely-piloted vehicles (UAVs/RPVs). Specifically, the present invention relates to a system and method of determining and evaluating pre-flight or in-flight conditions for such vehicles by combining one or more analyses and assessments of risks from weather conditions with rules relevant to operating UAVs/RPVs.

BACKGROUND OF THE INVENTION

In the United States, the Federal Aviation Administration will soon allow unmanned aircraft systems (commonly referred to as UAVs/RPVs or drones) to be flown for commercial applications, such as for agricultural field scouting. Following this allowance, many licensed and unlicensed operators of these aircraft will operate, and nearly anyone may be able to rent a UAV/RPV for commercial and non-commercial use in the near future. Regardless of current or future operation, individuals and companies providing UAV/RPV services over greater distances are affected by weather patterns that can change significantly, temporally and spatially, as they operate and move from work order location to work order location.

Experienced, licensed operators avoid adverse conditions, whereas untrained operators may not fully understand the current or forthcoming flight conditions, and may therefore fly in unsafe conditions. Such unsafe conditions might be fog, strong winds, powerful wind gusts, precipitation, and rapidly changing temperatures and other weather factors that deteriorate flight conditions. A fast moving or quickly developing weather system may affect even experienced and licensed operators. As example of this risk, an untrained operator may fly an aircraft outside of a registered flight plan or even take off or operate the aircraft outside of a designated operating area, at least in part in response to weather phenomena.

Poorly trained or significantly inexperienced operators may frequently operate rented aircraft. These inadequately trained or inexperienced operators may attempt flights that intersect with poor flight conditions within a flight plan, or attempt to fly the aircraft outside of the designated operating area or registered flight plan as noted above. Including potentially hazardous payloads, such as chemical applications, significant risk to property and life exists if an operator is flying an aircraft in non-ideal or non-appropriate flight conditions, and such risks are ever-present for both trained and untrained operators. Rental companies may therefore be at risk for losing aircraft or be involved in property damage or personal injury litigation due to the compromised safety or death of persons and damage to livestock or other property interests.

Insurance companies have an interest due to their business activities in insuring against damage to aircraft, property (whether commercial, public, or private), or lifeforms, and these entities would be at risk for significant litigation costs or expensive insurance premiums. Flights undertaken in non-optimal or non-appropriate conditions are a risk to underwriters and others in the insurance industry in that they result in lower profit margins or lost profits, higher premiums, and potentially lengthy litigation or class action lawsuits.

Additionally, operators or aircraft owners may be liable for fees or fines from the Federal Aviation Administration or other national and international governing bodies for violating visual flight rules (VFR), instrument flight rules (IFR), and other rules if the aircraft is operated improperly or during improper conditions. Even with an experienced operator, an aircraft may not function or operate as intended under certain flight or weather conditions.

There is no existing system, method, or device that applies weather information to operation of UAVs/RPVs that monitors, provides advisories and warnings for, and prevents flight. Without such a system, method or device to prevent or restrict a flight under adverse conditions, aircraft will continue to perform risky activities. If an unmanned aircraft can be used in adverse conditions, it will. These ill-functioning or mal-performing flights may result in fees or fines as mentioned above, but worse circumstances or situations may arise from these types of non-operator-oriented issues.

Additionally, there is further risk associated with companies providing UAV/RPV services having to send crews and aircraft to non-optimal locations, resulting in delayed work orders or cancelled work orders. This type of risk of lost revenue may start before a flight has even begun. Areas as wide as even a few miles can be impacted by significantly different weather conditions. A crew may make decisions from a single flight or a set of flights without a complete understanding of weather conditions that in turn leads to a series of adverse-weather-related flight delays. Costs of these delays may not be recouped, resulting in lost revenue.

The lack of a pre-planned and weather-coordinated flight may also affect a time-critical or spatially-critical payload delivery, further exacerbating lost revenues. As an example of this, changing weather conditions may disperse chemical applications beyond a planned delivery area, resulting in damage to neighboring crops, livestock, water, and soil.

BRIEF SUMMARY OF THE INVENTION

It is therefore one objective of the present invention to provide a system and method of evaluating flight conditions for UAVs/RPVs, including pre-flight, in-flight, and post-flight conditions. It is another objective of the present invention to combine analyses of risks from weather conditions with assessment of rules pertaining to, depending on the situation, the operator, the intended mission, the intended flight plan, the payload, the UAV/RPV itself and other mission and flight characteristics. It is yet another objective of the present invention to provide an advisory service for determining a "fly" or "no-fly" flight status of unmanned aircraft systems. It is still another objective of the present invention to provide an advisory service for preventing takeoff of, or preventing interference from recovery of, a UAV/RPV.

The present invention is a framework and service for combining weather risk analysis and flight condition evaluation that examines recent, current, historical, or forecasted weather conditions for one or more locations of a UAV's/RPV's takeoff, flight path, and landing. The present invention performs analyses using current, historical, and forecasted weather data and rules pertaining to the operator, the aircraft, intended mission, payload, and other characteristics as needed, and generates one or more of instructions, advisories, alerts, confirmations, rejections, or signals depending on system configuration. The present invention is also a system and method of determining a flight condition advisory that applies one or more of current, historical, and forecasted weather conditions for takeoff, flight path, and landing of UAVs/RPVs.

Other objects, embodiments, features, and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWING

The accompanying drawing, which is incorporated in and constitutes a part of this specification, illustrates several embodiments of the invention and together with the description, serves to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a weather risk analysis and flight advisory framework 100, embodied in one or more systems and methods that provide a service and application programming interface for combining weather risk analysis and an evaluation of flight conditions for takeoff, operation, flight path, payload delivery, and landing of unmanned aircraft systems that included unmanned aerial vehicles and remotely-piloted vehicles (UAVs/RPVs). The present invention is comprised of several components for performing the above objectives in the one or more systems and methods disclosed herein.

Figure 1:
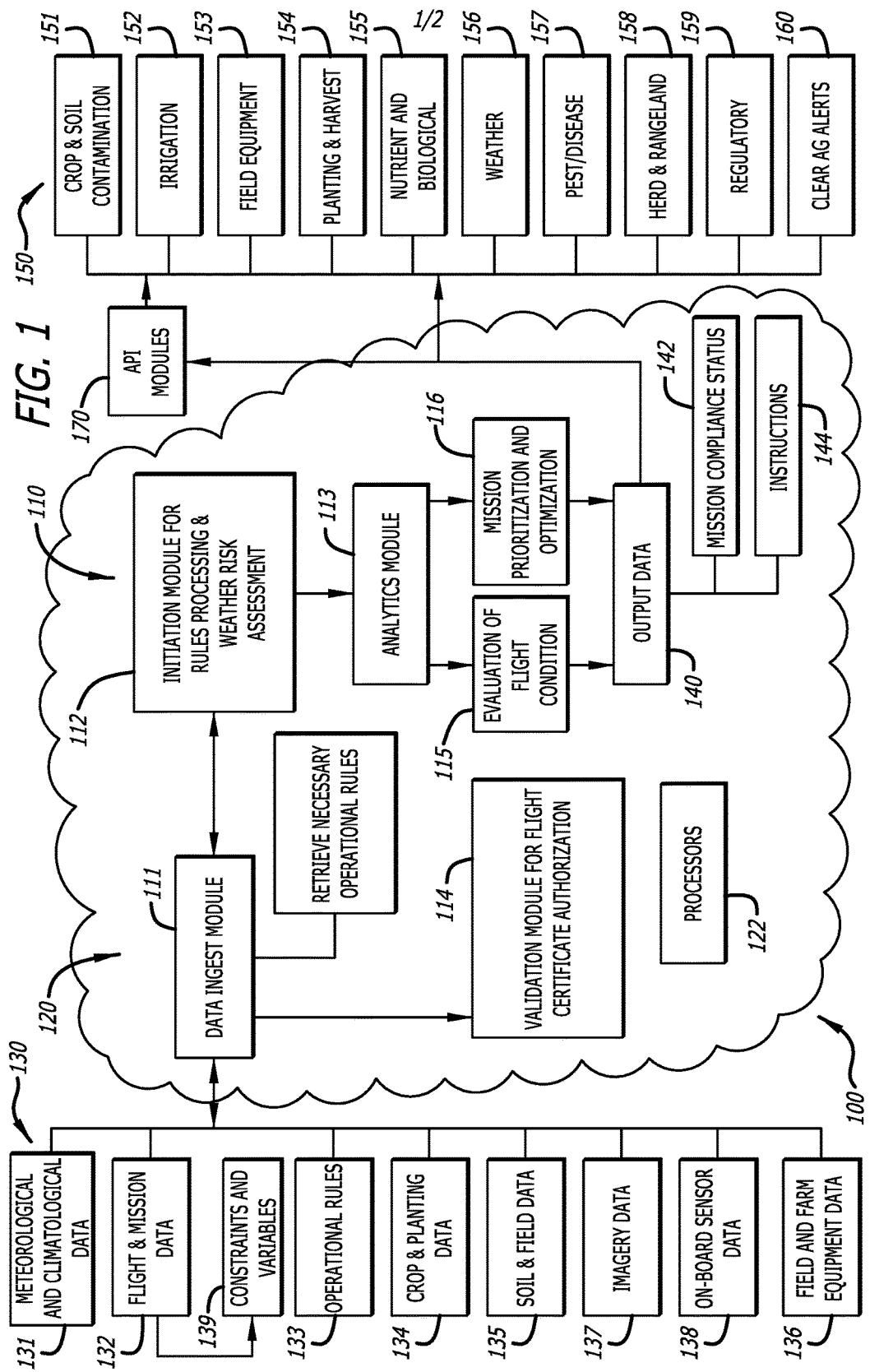
FIG. 1 is a block diagram of components of a weather risk analysis and flight advisory framework according to one aspect of the present invention.

FIG. 1 is a block diagram illustrating these components. The weather risk analysis and flight advisory framework 100 is performed within one or more data processing components 110, within a computing environment 120 comprised of hardware and software components that include at least one processor 122. The at least one processor 122 is configured to execute program instructions that process input data 130 of various types, and carry out analytical functions that produce the output data 140 as described further herein. The present invention and data processing components 110 may include a data ingest component 111 configured to receive, request, and/or retrieve input data 130 and distribute that information to the various other components 110 within the weather risk analysis and flight advisory framework 100, and service and application programming interface thereof.

The data ingest component 111 is configured to request, retrieve, ingest, store, and arrange the necessary data pieces for the weather risk analysis and flight advisory framework 100. This may be initiated by a data and system initialization component 112, which is configured to receive and process a request for mission/flight compliance assessment, whether from a user, an embedded or on-board system, or another software system or service (collectively, the requestor), that at least includes flight and mission data 132 comprised of the intended flight plan(s), work orders, and other information as noted further herein. The data and system initialization component 112 sends the request to the data ingest module 111 and to one or more additional data processing components 110. The data and system initialization module 112 may also be configured to return the processed results back to the requestor. Based on the input data 130 initially ingested, the data and system initialization module 112 may retrieve additional information such as operational rules 133 for a specific flight or mission to be performed, via the data ingest module 111.

The data and system initialization component is part of a rules processing and weather risk analysis initialization system and module, which is configured to initialize the analyses performed in the weather risk analysis and flight advisory framework 100, and to examine and assess meteorological and climatological data 131 comprised of historical, recent, current or forecasted weather conditions for location(s) of the takeoff, flight path, payload dispersal area, and landing, as well as to assess appropriate rules pertaining to, but not limited to, the operator, aircraft, mission, and payload. The rules processing and weather risk analysis initialization system and module also includes an analytics module 113, within which one or more statistical analyses are applied, using at least the meteorological and climatological data 131 and retrieved operational rules 133, to generate an evaluation of a flight condition 115 (such as a fly or no-fly status), with justifications as needed. The statistical analyses performed in the analytics module 113 may further include risk analyses, using for example information from a collection of previous flights, actuarial data, and the aforementioned rules that, in conjunction with the other input data 130, can be processed via one or more logic units. Such a logic unit may examine an operational rule 133 and compare its components against the appropriate other input data 130 to confirm or deny compliance with an operational rule 133.

Additional data processing components 110 may be employed in the present invention at preliminary or initial stages. One such component 110 is a flight validation and authorization service 114, embedded in at least one module, which may be applied prior to the performance of the components of the rules processing and weather risk analysis initialization system and module. The flight validation and authorization service 114 may be configured to register flight plans with a government agency or service, confirm a validity of a flight certificate of authorization, and electronically issue a certificate before beginning other steps or components of the weather risk analysis and flight advisory framework 100.

A further component 110 may be employed to provide an override option for certain missions. Such an override component may be utilized, for example, where a request from a licensed, experienced, and qualified operator is received for a flight plan or mission that is outside of normal operating constraints. The override component validates the override request with an authoritative service, usually a government agency or company service that can issue overrides, depending on the severity of the override.

It should be noted that UAV/RPVs may include both partially autonomous and fully autonomous flight vehicles. A fully autonomous flight vehicle is one that does not accept human inputs other than the pre-programmed purpose of a mission. A partially autonomous flight vehicle is one that does accept human inputs to varying degrees, so that it is capable of accepting some form of human direction and is at the same time capable of autonomous action. Therefore, flight advisories, mission prioritization and optimization, and output signals and instructions for many different types of UAVs and RPVs are within the scope of the present invention.

The present invention contemplates that many types of input data 130 may incorporated into the modeling and analytics described herein, and are within the scope of the present invention. For example, the weather risk analysis and flight advisory framework 100 may apply agricultural information such as crop and planting data 134, soil and field data 135, and field/farm equipment data 136 to produce the output data 140 resulting from the flight condition evaluation. Additionally, the weather risk analysis and flight advisory framework 100 may also apply imagery data 137 and on-board sensor data 138.

On-board sensor data 138 may include information collected from one or more sensors configured aboard a UAV/RPV itself, and such data may be collected before, during, or after a mission, depending on the output data 140. Such sensors may include weather sensors and flight-related sensors such as those for monitoring flight safety, and may collect many kinds of information. For example, specific types of sensors may include air temperature, wind speed, wind gust, internal aircraft temperature, and payload-safety sensors (e.g., spray nozzle pressure, chemical tank level sensor) configured on-board UAVs/RPVs. Other aspects of a flight or a mission may also be monitored by on-board sensors, such as those for determining obstacles or flight challenges using altimetry (radar or laser-based (LiDAR)) or imaging sensors, such as multispectral imaging and hyperspectral imaging. Output from on-board sensors may be either raw or reformatted/processed. Data collected by such sensors may be reformatted or processed through a pluggable module on board the UAV/RPV, or from a ground station following transmission from the UAV/RPV. Such data may be represented as point-based numerical data stream, polygon-based digital representations, gridded data, or multi-dimensional (e.g., 3-D) data.

Flight and mission data 132 includes, as noted above, flight-specific and mission-specific parameters such as the intended flight plan(s), work orders, and may further include many other items of information, such as craft type, specific mission details such as mission, mission type, payload(s), payload type(s), payload availability, crew/operator characteristics, and any clearances or overrides needed. Other parameters in the flight and mission data 132 may include payload operation(s) and payload operational characteristics (e.g., whether or not the payload exudes chemicals or is otherwise a known soil, water, crop, or animal contaminant, and how much time is needed to load a payload following completion of a previous mission). Examples of payloads include the sensors listed above, soil sampling equipment, and chemical application equipment (whether aerosol, droplets, granular, or other chemical delivery mechanisms). Flight and mission data 132 may further include, or define, one or more constraints and variables 139.

Craft type may include information related to the aircraft used for the mission, and its configuration and performance characteristics. For example, the UAV/RPV may be a fixed wing aircraft or a rotary aircraft or a hybrid. Craft configuration and performance characteristics may include the number of rotors, whether it is capable of hovering, whether it is autonomous, partially autonomous, or fully/remotely piloted,—the maximum flight time on full battery capacity for minimum and maximum payload weight values assuming no payload energy draw, and minimum and maximum values for flight speed, flight speed with payload, and payload weight.

Imagery data 137 may include satellite data that may be used to focus a mission on particular geographical areas. Imagery data 137 may be used to focus on a stressed area of a field, for example to apply appropriate chemicals, to take higher resolution imagery of the area than a satellite can do, or to avoid spraying expensive chemical on areas where it is not needed. A flight condition evaluation 115 may generate an output that instructs the mission to proceed for that constrained geographical area. Field and farm equipment data 136 includes data collected and transmitted by machines, such as a combine in a field to which a payload is to be applied. In such an example, the combine may transmit its location, and this information would enable the rules processing and weather risk analysis initialization system and module of the weather risk analysis and flight advisory framework 100 to issue an instruction 144 to avoid the combine's area of operation. This may avoid collisions, as well as any atmospheric interference due to significant particulate matter being discharged from the combine, for example. Other data 139 may include any other information that may be used for evaluation of a flight condition 136 within the weather risk analysis and flight advisory framework 100.

As noted above, many types of output data 140 are possible—such as a mission compliance status 142 to confirm or deny compliance with operational rules 133, and/or instructions 144 to control operation of UAVs/RPVs, and one or more advisories 150. Additionally, many different users and uses of this output data 140 are possible. As noted above, the weather risk analysis and flight advisory framework 100 of the present invention generates one or more outputs 140 from the flight condition evaluation 115 that are used by other systems, such as software, devices, services, and application programming interfaces 170, to perform several functions. Generally, the outputs 140 can be configured to communicate signals indicative of or resultant from a flight or mission compliance status 142, such as "fly" or "no-fly". Other functions include instructions 144 enforcing or enabling the mission compliance status 142, such as preventing takeoff of, or preventing interference from recovery of, a UAV/RPV, and adjusting parameters of a mission or flight plan to be undertaken by the UAV/RPV. An instruction 144 may further include an arrangement or prioritized listing of work orders for unmanned aircraft, for example as a result of flight plan or mission priority assessment and/or as an output of mission prioritization and optimization 116, discussed further herein.

It should be noted that many types of instructions 144 are possible and within the scope of the present invention. The instruction 144 may be considered as a fly or flight instruction 144, such as for example to adjust altitude, direction, or speed in light of weather conditions in the flight-path or during the time of flight. A takeoff prevention instruction

144 may be issued, to enforce a no-fly status. A payload-specific instruction 144 may be generated, such as for example to withhold a timing of payload delivery for x number of minutes or seconds. A recovery interference prevention instruction 144, as noted herein, is yet another example.

Further examples of these functions and the modules configured to execute them include a flight control system that, upon receiving an instruction 144 resulting from a "no-fly" mission compliance status 142 from the weather risk analysis and flight advisory framework 100, locks out ground controls and therefore also the operator from taking off or, in the event that the aircraft is currently operational and flying, prevent the operator from preventing the UAV/RPV from returning and landing using a predefined recovery path. The flight control system may be provided as a device embedded or otherwise configured on board the UAV/RPV that, upon receiving a "no-fly" instruction 144 following determination of a mission compliance status 142 from the weather risk analysis and flight advisory framework 100, locks out the ground controls to prevent the UAV/RPV from receiving signals to take off on a pre-programmed mission that has been given a no-fly status. If the device receives a no-fly status during a mission, it reverts to the emergency mission recovery status and lands itself, or utilizes whatever emergency landing measures are at its disposal.

Another example is a certification module, which may be embodied in the flight validation and authorization service 116 (or other service or software package) that delivers the necessary signed authorization certificate for a UAV/RPV to operate, but only does so upon receiving a 'fly' signal as an instruction 144 from the weather risk analysis and flight advisory framework 100. Without the authorization certificate, a UAV/RPV would not be able to operate. Additionally, if in mid-flight the service or software package or UAV/RPV receive a no-fly status, the authorization certificate becomes invalid or is otherwise revoked, and the UAV/RPV then utilizes whatever emergency landing measures it has at its disposal.

Still another example is a hardware component, such as a dongle, that operates similarly to the flight control system and the embedded device. Such a hardware component is removable and/or programmable for other missions and for other UAV/RPVs.

In another embodiment, the present invention may also provide mission prioritization and optimization 116, in a module or other package of hardware and/or software components that, given an array of possible or plausible flight plans, prioritizes, orders, or otherwise analyzes the list of flight plans to find an order of missions and flight paths that is optimized to the needs of the owner or operator.

Examples of such an optimized need may be to maximize the amount of flights per a period of time or to minimize the amount of flight time while maximizing payload efficiency. A more detailed example of an optimized need includes having a work order that has the need to apply chemicals under certain conditions, but several work orders with significantly less constraints 139 on delivery timing or conditions.

Such mission prioritization and optimization 116 may involve maximizing or minimizing aspects of other logistical problems as well, such as for optimizing individual flights, a collection of flights for a single craft with multiple crew, for a single crew with multiple aircraft, for multiple crews and crafts, for multiple regions that may have overlapping service regions, for crews and craft operating on a national, international, or global scale. In the latter logistical problem, an example would be optimizing a list of flight plans for taking high elevation photometry for, among other purposes, agricultural or ecological purposes of several widely dispersed plots of land, especially, but particularly for critical timing of the snapshots (e.g., not during the night).

Finding an optimal work order arrangement given the aircraft-type required, travel times between work order locations, and other resource constraints 139 is a "constrained problem." Work orders may be arranged randomly, based on proximity to previous work order or current location, by mission-type (multispectral data capture, LiDAR capture, nitrogen application, insecticide application, etc.), wind conditions, air temperature, visibility, time of day of flight, and many other ways. Optimizing using only one of these dimensions may generally be suboptimal, and therefore optimizing based on as many dimensions as can be considered leads to a more optimal arrangement. Another feature of considering more problem dimensions is the ability to adjust the weight or importance of the dimensions. For example, if there are more crews and crafts than jobs, then a user can decrease the importance of the travel time between jobs, which increases the importance of other, higher-weighted dimensions (e.g., suitability of weather conditions, time-sensitivity, profitability) and may reduce the risk of such prioritized flights from being delayed due to conditions that may arise from being lower on a work order list (e.g., changing weather conditions for scheduled flight time(s), mechanical aircraft failure(s) in a flight occurring earlier in a work order list).

The present invention optimizes the flight plans in analytics module 113 to generate mission prioritization 116 using an appropriate optimization algorithm, such as a constraint satisfaction algorithm, for example arc consistency algorithm #3 (AC-3). Constraint satisfaction is the process of using artificial intelligence to find a solution to a set of constraints 139 that impose conditions that one or more variables must satisfy. An optimal solution is therefore a set of values for the variables that satisfies all constraints 139. At times, one or more suboptimal solutions may be all that exist. In these suboptimal situations, the "weights" or priorities assigned to each variable, automatically, by one or more manual human actions, or both, may be adjusted to suit the needs, goals, or priorities of an organization, an organization's operating region, or many other human or economical situations. The adjustments to the weights or priorities enable the system to rank or sort the suboptimal solutions, presenting the more desirable suboptimal plans higher in the list of plans, if more than one plan is presented, or by presenting the best plan based upon the way the variables 139 have been weighted in addition to the prior plan analyses. Manual, or human, action may occur using a user interface or other means, such as via an API or a DIP switch, that allow users to manually enter or adjust the importance of certain variables 139. For example, such a user interface may provide for adjustment of variables 139 such as travel time, mission profitability, flight duration, mission type or any other flight, business cost/profitability, and payload-based variables 139. The present invention may apply an appropriate optimization algorithm to both short and longer (such as 10+ days) range weather-dependent work-order scheduling and optimization. It should be noted that AC-3 is but one example of an optimization algorithm for constrained problems. Regardless, it should be noted that the present invention may therefore develop and apply one or more artificial intelligence techniques to automatically and continually learn a significance of each variable to a constraint from how it affects each constraint, given an adequate set of data to evaluate an operational need. The artificial intelligence techniques may assign various weights to each constraint, and adjust those weights, as it continued to learn and model the significance of each variable.

As noted above, the present invention performs statistical analyses and assesses risks associated with weather conditions that are relevant to aspects of operation of a UAV/RPV, such as for example its mission, intended flight path or plan, and delivery of its payload. To perform the analyses that provide these assessments, the weather risk analysis and flight advisory framework 100 ingests many different types of weather information among the meteorological and climatological data 131. This includes real-time, historical, predicted, and forecasted data representative of assessments of localized weather conditions, and may include long-range climatological and/or meteorological forecasting, in one or more predictive weather models.

Such real-time data representative of assessments of localized weather conditions may be produced by many different sources of meteorological and climatological data 131 to provide one or more of observed weather data and current analyses of observed weather data, and predicted weather data, for example as data that is complementary to the data assimilation systems and forecasting systems noted below. Such additional sources of weather data may include data from both in-situ and remotely-sensed observation platforms. For example, numerical weather prediction models (NWP) and/or surface networks may be combined with data from weather radars and satellites to reconstruct the current and near-term forecasted weather conditions on any particular area to be analyzed. There are numerous industry NWP models available, and any such models may be used as sources of meteorological data in the present invention. Examples of NWP models at least include RUC (Rapid Update Cycle), WRF (Weather Research and Forecasting Model), GFS (Global Forecast System) (as noted above), and GEM (Global Environmental Model). Meteorological data is received in real-time, and may come from several different NWP sources, such as from the European Centre for Medium-Range Weather Forecasting (ECMWF), Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global and localized observation resources may also be utilized. Such mesoscale numerical weather prediction models may be specialized in forecasting weather with more local detail than the models operated at government centers, and therefore contain smaller-scale data collections than other NWP models used. These mesoscale models are very useful in characterizing how weather conditions may vary over small distances and over small increments of time. The present invention may be configured to ingest data 131 from all types of NWP models, regardless of whether publicly, privately, or internally provided or developed.

Long-range climatological and/or meteorological forecasting may be generated by, in one aspect of the present invention, dynamical extended range weather forecast models generated from known methods for inter-seasonal to inter-annual climate prediction, which have evolved into a combination of deterministic and statistical modeling schemes that permit the capture of long-term low-frequency features. Such forecasting often requires global analyses for the specification of observed initial and boundary conditions, the use of sophisticated numerical weather prediction models, a statistical treatment of the model results, and a verification of the forecast results as a feedback into forecast refinement.

Long-range climatological and/or meteorological forecasting may involve the use of two data assimilation systems and two forecasting systems. The two data assimilation systems may be used to provide historic and current atmospheric and land surface initial conditions and also global ocean temperatures. For example, the two forecast systems may incorporate the U.S. National Centers for Environmental Predictions (NCEP) Global Forecast System (GFS) for atmospheric predictions and the Geophysical Fluid Dynamics Laboratory Modular Ocean Model to provide sea-surface temperature predictions. Software and data supporting the above are publicly available from the NCEP.

It is to be understood that the weather risk analysis and flight advisory framework 100 of the present invention may be embodied as a hardware and software package in many different forms. In one embodiment, the present invention is an in-craft, on-board device that provides all of the modular services as the weather risk analysis and flight advisory framework 100, but does so within the UAV/RPV itself. The UAV/RPV therefore includes on-board systems to retrieve, request, ingest, or otherwise obtain the necessary data items or their timely updates, including from on-board sensors.

In another embodiment, the present invention is a ground control station-based device that provides all of the modular services in the weather risk analysis and flight advisory framework 100. The ground control station(s) therefore have embedded systems to retrieve, request, ingest, or otherwise obtain the necessary data items or their timely updates, including from nearby sensors or sensors on board the unmanned aircraft.

The present invention may also be embodied in a pluggable module that can be inserted into the UAV/RPV or ground control station(s) to provide all of the same modular services as the weather risk analysis and flight advisory framework 100. Such a pluggable module may be, for example, a USB stick, parallel port dongle, or another form of a pluggable integrated circuit chip. The pluggable module also includes components to retrieve, request, ingest, or otherwise obtain the necessary data items or their timely updates, including from nearby sensors or sensors on board the unmanned aircraft.

The present invention may further be embodied in a software package, library, or other software-oriented component that also provides all of the same modular services as the weather risk analysis and flight advisory framework 100. Alternatively, the present invention may be embodied in a hardware package, module, circuit board, chip, component, or other electronic hardware-oriented system that provides all of the same modular services as the weather risk analysis and flight advisory framework 100. Such software and hardware has components within it to retrieve the necessary data items or their timely updates.

In another embodiment, the present invention is embodied as a specific advisory service 150 or specific application programming interface (API) module 170 configured to provide all of the modular services described above and generate a specific outcome. Such a service 150 or API 170 may be tailored for particular characteristics or utility relative to UAV/RPV missions. For example, the present invention may provide a contamination advisory service 151 for crops, soils, and groundwater or aquifers that is provided to owners of fields or growers of crops on fields that are located within a certain distance of crops for which chemicals are applied by UAVs/RPVs. It is to be noted that advisory services 150 may be provided as a specific outcome of the present invention where it is configured to provide all of the modular services described above in a packaged format, and the advisory services 150 may also be processed from output data 140 (either directly, or via the API modules 170).

Regardless, many advisories 150 are contemplated. Examples of advisory services 150 include other agricultural management services such as an irrigation advisory service 152, a field equipment advisory service 153, a planting and harvest advisory service 154, and a crop and soil nutrient and biological application advisory service 155, a weather advisory service 156, a pest/disease advisory service 157, a herd, feed, and rangeland management advisory service 158. Additional management services may include a regulatory advisory service 159. Clear Ag and other alerting is still another service 160 contemplated by the present invention.

All of these advisories 150 are possible with the output data 140, based on the input data 130 ingested or collected in-flight. For example, in the case of the weather advisory service 156, one possible implementation with regard to weather data collected in-flight, and aircraft-based flight path data regarding a chemical application, is information regarding wind speeds, air pressures, air temperatures, and other such weather information which may be valuable to weather data processors for additional "ground truth" measurements for quality control services and other uses. In another example, a regulatory advisory service 159 may combine aircraft-based data to create statistical analyses of the aircraft, pilot (if applicable), mission parameters, and several other items that can be aggregated or collected for re-use within the present invention or for external assessments (e.g., by the Federal Aviation Administration or other regulatory body, or by aircraft manufacturers or parts manufacturers). Another example of a regulatory advisory service 159 is an indicator of environmental impact from runoff following delivery of a chemical payload.

In a further example, an irrigation advisory service 152 may consider payload delivery information, combined with weather data collected in-flight and other relevant information, to inform growers, landowners, or other responsible parties of irrigation mitigation actions, such as the positioning of flood, drip, and spray irrigation equipment, the timing of their use, and amounts of artificial precipitation to be applied. In still a further example, one or both of the herd, feed, and rangeland management advisory service 158 and the irrigation advisory service 152 may apply various types of data to provide information for irrigation requirements for achieving crop temperature and crop moisture thresholds for livestock herd management, in light of ground truth measurements collected in-flight, and the outcome of a payload delivery. It is therefore to be understood that many such advisory services 150 and API modules 170 are possible and are within the scope of the present invention.

In another embodiment of the present invention, the weather risk analysis and flight advisory framework 100 may be specifically configured to provide one or more of a flight advisory, operational instruction(s) (such as a mission/flight plan priority or work order arrangement), mission compliance status, and other output data for mission types that include package delivery, land surveying for construction or insurance companies, animal and environmental monitoring, video capture (e.g., for movie studios, outdoor racing events), law enforcement activities (e.g., border surveillance), and traffic flow reporting and monitoring. Many different types of activities may be included within this embodiment, and therefore it is to be understood that the weather risk analysis and flight advisory framework 100 may be applicable to many different types of missions.

Output data 140 generated by the weather risk analysis and flight advisory framework 100 reflects the mission type, and the operational rules 133 governing that type. For example, where the mission type is package delivery, the output data 140 may include a mission compliance status 142 that regulatory approval has been received to deliver a package to a specified area at a specified time. An operational instruction 144 also reflects the mission type, such as that a flight must not exceed a specified height, for example where the package delivery specifies a flight path that is proximate to a commercial airport.

Continuing with an example where the mission type is a package delivery, where mission prioritization and optimization 116 is modeled in analytics module 113, a mission prioritization for a mission type comprised of package delivery services may factor variables 139 such as order status for premium customers and preferential delivery times specified at stated delivery address. Therefore one possible constraint to be weighted in prioritizing missions and flight plans is delivery times for various customers. Other variables 139 may include package weights and fuel or energy costs associated with delivery of packages having different weights during differing weather conditions and times of the day or night.

Figure 2:
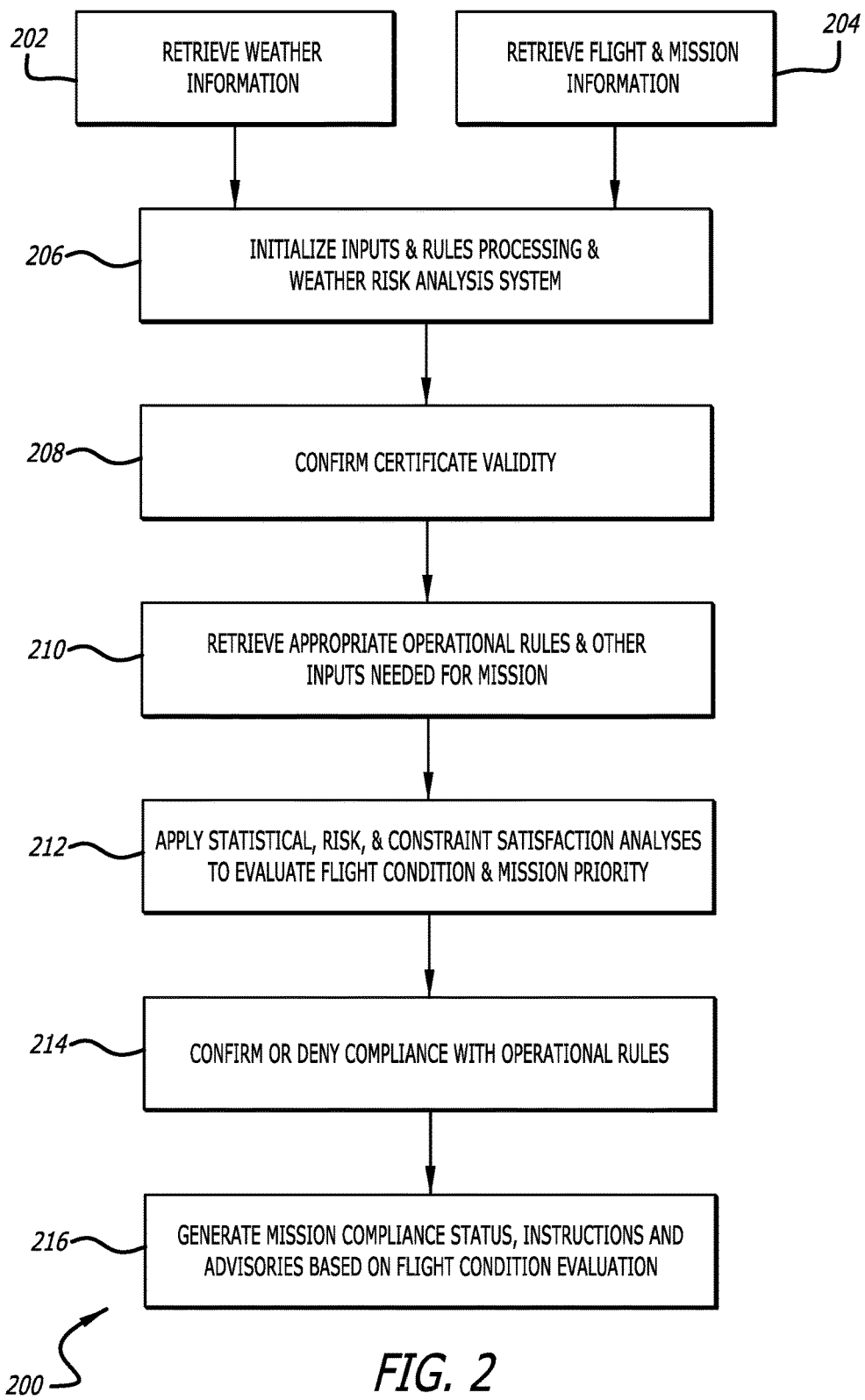
FIG. 2 is a diagram of a process of evaluating a flight condition and generating output data in the weather risk analysis and flight advisory framework according to another aspect of the present invention.

FIG. 2 is a diagram of a process 200 of evaluating a flight condition and generating output data 140 in the weather risk analysis and flight advisory framework 100, according to one aspect of the present invention. In such a process 200, the present invention retrieves, requests, ingest, or otherwise obtains 202 meteorological and climatological information, and also retrieves, requests, ingests, or otherwise obtains 204 information pertaining a flight and mission of an unmanned aircraft. The present invention 100 then initializes 206 the rules processing and weather risk analysis system and module, confirms 208 flight certificate validity, and retrieves, requests, ingests, or otherwise obtains 210 the appropriate operational rules 133 and other input data 130 needed for a mission. The weather risk analysis and flight advisory framework 100 obtains input data 130 at steps 202, 204 and 210 from sources that contain, among others, current conditions or observational analyses, other weather information, previously recorded in-flight weather instrumentation data, business and flight rules, and data necessary to associate operators, aircraft, locations, other operational rules, and any other type input data 130. The data and system initialization component 112 also stores and arranges data from these sources, and particularly serves to prepare necessary data pieces for the function to be performed in the weather risk analysis and flight advisory framework 100 in the initialization step 206. The data and system initialization component 112 may be comprised of and include separate subcomponents that specifically pertain to each type of input data 130 to be utilized.

The data and system initialization component 112 may initiate the process 200 in response to a request for an evaluation of a flight condition 115, and in response to such a request, receives and processes mission-specific flight parameters such as the craft type, the mission and mission type, the payload(s) and payload type(s), any clearances needed, any overrides, operator details, and more. The data and system initialization component 112 first ensures that all necessary inputs have been received. If insufficient data is provided, a request may be immediately denied, and any denied request is returned to the requestor and may contain a detailed explanation of the denial. A request that contains enough necessary information is then passed along to the analytics module 113 of the rules processing and weather risk analysis system and module. At the output of the rules processing and weather risk analysis system and module, processed data may then be logged into a data store system for, among other reasons, monitoring, auditing, and future review and then sent back to the requestor.

The rules processing and weather risk analysis system and module processes a request within the weather risk analysis and flight advisory framework 100 by examining current, historical, predicted or forecasted weather conditions for the locations of the takeoff, flight path, payload operation, and landing, and retrieving the appropriate operational rules 133 pertaining to but not limited to the operator, aircraft, aircraft/flight mission, and payload. The rules processing and weather risk analysis system and module then applies one or more statistical analyses 212 to evaluate a flight condition using the meteorological and climatological data 131 and based upon the appropriate operational rules 133, and returns a mission compliance status 142 with justifications as needed, and one or more instructions 144, if needed. The statistical analyses are probability calculations to assess mission risk, and enable one or more further risk analyses that, in conjunction with the other input data 130, can be processed via one or more logic units to confirm or deny compliance at step 214 by examining the rule components against the appropriate input data 130. The process 200 then generates, at step 216, the instructions 144 (such as a fly or no-fly status) and advisories 150 that further comprise the output data 140 based on the evaluation of the flight condition 115.

Rules processing may occur in many different ways. In one example, for an operational rule 133 that states no flight may occur if probability of loss of control of an aircraft exceeds 1% for an operator with 5 or more years of remotely-piloted vehicle experience, the present invention may receive a tokenized rule formatted especially for the analytics module 113 logic unit(s). A tokenized rule is one that associates a rule component to input data 130 and includes as part of the rule component a threshold or expected measurement and a score or other indicator type for use in the "fly" or "no-fly" computation. The logic unit receives one or more inputs, such as the rule component to be examined and the necessary associated inputs, and then performs a mathematical, logical, or textual comparison. A logic unit, according to the association(s) indicated by the rule component, then processes each component of the tokenized rule component. An example association of a rule component might be: the probability of loss of control of a remotely piloted vehicle actuarial table for operator experience levels. To provide an example of the logical processing for the logic unit, a rule component of "whether the probability of loss of control of a remotely piloted vehicle for an operator with 5 or more years of experience exceeds 1%" has two associated inputs: the operator experience is 7 years and the actuarial table for this situation, and the indicator type of "fly" or "no-fly". In this example, the probability for an operator with 7 years of experience is 0.5%. By comparing the rule component's desired threshold for a "fly" signal, that the probability be less than 1%, with the example data of 0.5%, the logic unit can derive a score or indicator based upon the desired score type or indicator provided in the rule component. In this example, the logic unit would return a "fly" signal to be included in the remainder of the rule processing system's calculations for this particular flight's analysis. Another example of an input that pertains to a rule component's loss of control with regards to the operator experience is the probability of loss of control for a remotely piloted vehicle for wind speed per operator years of experience. A separate request to a logic unit would be issued if this input is supplied in addition to the aforementioned, but statistically more generic, probability of loss of control of a remotely piloted vehicle actuarial table for operator experience levels.

The output(s) of the logic unit(s), as mentioned, is further processed in the rules processing model and may, for example, generate a final "fly" or "no-fly" rating or score for the rule being processed. This processing may be a mathematical, logical, or textual comparison or formulation to calculate the mission risk probabilities. For example, if each rule component analysis returned a mathematical, logical, or textual equivalent score or indicator as "fly", one instantiation of the final rule output might be to simply return "fly" if each component-wise analysis returns "fly" as well. Another instantiation might be to reach by summation of sub-scores a flight quality index. Another instantiation may be to a mathematical and logical formula such as if all sub-scores are above a 99.9999% success rate threshold. The final output ("fly" or "no-fly", with or without additional details) for each rule is then processed again. This final processing of the collection of all the rule outputs may be similar to the most recently mentioned processing, where the outputs of all of the rules are mathematically, logically, or textually compared or formulated to derive a final score or output indicating whether the flight is a "fly" or "no-fly", with or without additional details.

The analyses performed in the analytics module 113 may utilize several different approaches. One such approach utilizes outside-of-the-system, or a priori, risk analyses (e.g., flying this make/model with an air temperature in 40-45 degrees F. for 20 minutes has a 32.17% probability of an incident occurring, or the operator has a 98.23% success rate at 20-25 minute flight lengths) to compute a final probability and risk rating. Another approach is computing such probabilities from system-available data. Yet another approach is a hybrid of these two approaches.

In a further example, assume there are just a few parameters to a flight to be modeled: the flight is expected to last 22 minutes, the air temperature is 43 degrees F., the make/model of the UAV/RPV is known, and the pilot has a long track record available to the rules processing and weather risk analysis system and module. Using the a priori risk assessment approach mentioned above, one can compute a risk assessment for this flight (assuming each are independent probabilities) using statistical methods:

$P$(no aircraft-based performance incidents occurring)
=1−$P$(aircraft-based performance incident occurred)=1−0.3217=0.6783

$P$(no pilot-based incidents occurring)=0.9823

$P$(no aircraft-based performance or pilot-based incidents)=0.6783*0.9823=0.66629409

Then:

$P$(at least one incident occurring)=1−0.66629409=0.33371 or 33.37% probability of an incident occurring given the flight parameters.

A risk analysis compares the above statistical analysis in conjunction with one or more of the operational rules 133. For example, with a computed 33.37% probability of an incident occurring, a limitation (e.g., an operational rule 133) may be in place by the licensor, regulatory requirements, the aircraft owner, etc. that disallows any risky flights—for example, any risk rating less than what a pilot is rated for (e.g., rated for flights above the 90% risk-level only). Operational rules 133, it should be noted, may be defined any number ways. A rule 133 may be simple, such as "if an aircraft is rated for sustained wind speeds below 30 knots, then no flight may be undertaken if sustained wind speeds of 30 knots or greater are forecasted for the operating area", or a rule can be more complex. More complex rules may include stipulations for additional aerodynamic-performance impacts (wind gusts, precipitation type/rate, air temperature level or variations, visibility conditions, etc.), pilot or pilot license qualifications (managed flight hours, experience under similar conditions, number of hours logged with this particular aircraft or mission-type, etc.), payload restrictions (e.g., no payload operation when ground wind speeds exceed 7 knots), or complexity of ground clutter or airspace (such as skyscrapers, hills/valleys, variations in controlled airspace nearby, etc.). It is to be understood that any rule 133, simple or complex, may be created, provided sufficient data is available for its application.

The analytics module 113 of the rules processing and weather risk analysis system and module also includes analytical tools enabling the present invention to ingest further information and perform an additional and enhanced assessment of weather risk, especially in light of complex operational rules 133. This further information may include, among other types of input data 130, crowd-sourced weather data and historical or previous flight characteristics. This may include data such as mission-specific flight information 132 that was or is relevant to the mission undertaken or to be undertaken, such as for example the operator's history of maintaining appropriate altitudes when applying chemicals to a field and under particular weather conditions. In addition to ingesting additional information as needed, the analytical tools may use information such as this to determine modifications for triggering a rules infraction. One example may including considering whether an UAV/RPV operator, or the unmanned aircraft itself, has had issues with maintaining an appropriate altitude (above ground level, or AGL) when applying a chemical under the requested flight plan's or plans' anticipated weather conditions.

In addition to the analytical tools, the present invention may also include a general rules processing system configured to examine the parameters and characteristics relative to UAV/RPV operation, including the flight's inputs, operating conditions, laws, regulations, business rules, manufacturer limitations, and others. Another example of a flight's operational rule 133 might be that no class IV (in this example, an exemplary classification is used) unmanned aircraft may take off when ground wind gusts speeds are 15% over the sustained wind speeds, unless the sustained wind speeds are below 15 MPH. An example of a payload restriction rule may be that no amount of a chemical x may be applied when the air temperature has been above 95 degrees Fahrenheit for more than 120 minutes since the previous daily low, presuming that said low was below 95 degrees Fahrenheit. An example of a rule related to a manufacturer limitation may be that a UAV/RPV with a recent maintenance history with issue y may be limited to operation only within certain wind conditions or precipitation conditions. It is to be understood that many examples of such rules 133 are possible. Regardless, these rules 133 are codified in one or more formats, such as XML and JSON, and may be denoted in a domain specific language or other meta-format that is capable of describing the parameters, characteristics, rules, and other aspects of the rules, risks, operations, and other components of the controls, aircraft, operators, business, mission, and task.

Rules 133 may also be derived from Federal Aviation Administration mandates, Federal Highway Administration policies, manufacturer of the UAV/RPV, payload, or other equipment, state(s) within the operating area, county or counties within the operating area, municipalities within the operating area, insurance providers, owner or rental agency policies, and operator preferences, and other institutional or agency laws, rules, and regulations. For example, within the Federal Aviation Administration there are codes pertaining to IFR and VFR rules that may apply differently based upon the UAV/RPV, its payload, or its equipment load-out. These codes dictate and/or discern the appropriate rules based upon the available data within the initial data store system, and the inputs and codified rules.

It is contemplated that one or more additional pre-processing services or components may be included, such as for example a flight validation and authorization service 114 as discussed above. This flight validation and authorization service 114 may be needed as an initial step prior to a request from the weather risk analysis and flight advisory framework 100 to execute the analytical tools of the rules processing and weather risk analysis component. Such a flight validation and authorization service 114 may be configured to register flight plans with a government service and confirm that a valid flight certificate of authorization is valid before processing the request and performing the other steps or components of the weather risk analysis and flight advisory framework 100. Using the mission-specific flight parameters such as flight path and timelines, operator(s) and any applicable licensing, payload(s) and any applicable licensing, and additional inputs or outputs, a few example instantiations of the flight validation and authorization service 114 include the following. Sending a well-formed request to a flight authority for verification, validation, and logging of provided details and then receiving authorization to continue with the flight planning, risk analysis, and flight advisor service. Second, similar to the rule processing system, sending each applicable input, such as the operator's license, to a validation service and aggregating, parsing, and analyzing all of the authority service returns to aid in generation of a "fly" or "no-fly" flight rating. For example, if an operator is licensed only for certain regions or times, a verification or validation service may return a "fly" or "no-fly" indicator based upon a flight path or flight timeline and the service's records of licensure. Third, the inputs for the rules processing and weather risk analysis system and module may come directly from a flight authority service such that the present invention cannot be used without a flight validation and authorization service 114 first providing the inputs.

A further additional service may be included to provide an override option for missions that are outside normal operating constraints, in the override component noted above. Such an override system receives a request from a licensed, experienced, and qualified operator, and validates an override against an authoritative service, such as a government agency or company authorized to issue overrides, depending on the severity of the override. If an override is requested by the operator(s), a well-formed request is made, with the available inputs, to an entity, sequence of entities, or hierarchy of entities that are explicitly authorized to receive and process override requests and issue authoritative override request responses. The override request is logged for future review or auditing purposes. The override request is sent over a pre-authorized secure connection, similar to how certificate authorities and SSL connections operate. The secure connection may use the very same certificate authorities and SSL connections as common, secure Internet traffic. The result of the override request is logged for future review or auditing purposes. If an authorized override is provided, the present invention reruns using the overridden values or limits. Repeated requests for overrides may be necessary based upon changing variables 139, such as overridden values and ever-changing weather.

The systems and methods of the present invention may be implemented in many different computing environments 120. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
ingesting, as input data, weather information, mission-specific flight parameters for performance of a particular mission by an unmanned aircraft, and one or more operational rules for operation of a specific unmanned aircraft in the performance of the particular mission, the weather information including at least one of current weather data, historical weather data, and forecasted weather data for a specific geographic area for a time period coinciding with the performance of the particular mission, the mission-specific flight parameters defining the particular mission at a specific time and including one or more of a payload, a flight plan, a craft type, and a geographical location of the mission;
analyzing the input data in a plurality of data processing modules within a computing environment in which the plurality of data processing modules are executed in conjunction with at least one processor, the data processing modules configured to confirm a validity of a flight certificate of mission authorization for the particular mission, and perform a risk assessment for the particular mission relative to the weather information and the mission-specific flight parameters by 1) computing one or more mission risk probabilities of an occurrence of both aircraft-based performance incidents and operator-based performance incidents during particular weather conditions in a weather-based statistical analysis, 2) continually learning a significance of a plurality of variables affecting one or more previous missions that include weather variables, operator experience, aircraft parameters, and payload parameters, and impacting the performance of the particular mission, and assigning weights to each variable in the plurality of variables based on the learned significance and on the particular weather conditions in the weather-based statistical analysis for the performance of the particular mission to determine one or more outcomes for the one or more mission risk possibilities, and 3) comparing the one or more outcomes of the one or more mission risk probabilities from the weather-based statistical analysis with the operational rules, information from a collection of the previous missions by the specific unmanned aircraft, and actuarial data related to one or both of the specific unmanned aircraft and an operator of the specific unmanned aircraft, to evaluate a flight condition of the unmanned aircraft for the performance of the mission to determine a proceed status, a do not proceed status, or a recovery status for the operation of the specific unmanned aircraft based on the particular weather conditions analyzed; and generating, as output data, mission compliance status confirming or denying compliance with the one or more operational rules for the operation of the specific unmanned aircraft, and at least one operational instruction for the specific unmanned aircraft.

2. The method of claim 1, wherein the forecasted weather data includes weather forecasts for time periods coinciding with the performance of the particular mission.

3. The method of claim 1, wherein the operational instruction is at least one of a fly instruction, a takeoff prevention instruction, a payload instruction, and a recovery interference prevention instruction.

4. The method of claim 1, wherein the flight condition is at least one of a pre-flight condition, an in-flight condition, and a post-flight condition.

5. The method of claim 1, further comprising adjusting a flight plan by modifying one or more of the mission-specific flight parameters.

6. The method of claim 1, wherein one or more of the data processing modules are performed by a device embedded on board the specific unmanned aircraft.

7. The method of claim 1, further comprising delivering a signed authorization certificate to conduct the particular mission.

8. The method of claim 1, further comprising generating one or more management advisory services from the flight condition evaluation, the one or more advisory services including a plurality of alerts that include at least one of an agricultural operations advisory and a regulatory advisory.

9. A flight advisory system for unmanned aircraft, comprising:
a data ingest and initialization component configured to retrieve, store, and arrange weather information comprised of at least one of current weather data, historical weather data, and forecasted weather data for a specific geographic area for a time period coinciding with performance of a particular mission, mission-specific flight parameters defining performance of the particular mission by a specific unmanned aircraft at a specific time and including one or more of a payload, a flight plan, a craft type, and a geographical location of a mission, and one or more operational rules governing operation of the specific unmanned aircraft in the performance of the particular mission;
a mission analytics component configured to perform a risk assessment for the mission relative to the weather information and the mission-specific flight parameters by 1) computing one or more mission risk probabilities of an occurrence of both aircraft-based performance incidents and operator-based performance incidents during particular weather conditions in a weather-based statistical analysis, 2) continually learning a significance of a plurality of variables affecting one or more previous missions that include weather variables, operator experience, aircraft parameters, and payload parameters, and impacting the performance of the particular mission, and assigning weights to each variable in the plurality of variables based on the learned significance and on the particular weather conditions in the weather-based statistical analysis for the performance of the particular mission to determine one or more outcomes for the one or more mission risk possibilities, and 3) comparing the one or more outcomes of the one or more mission risk probabilities from the weather-based statistical analysis with the operational rules, information from a collection of the previous missions by the specific unmanned aircraft, and actuarial data related to one or both of the specific unmanned aircraft and an operator of the specific unmanned aircraft, to evaluate a flight condition of the specific unmanned aircraft for the performance of the particular mission to determine a proceed status, a do not proceed status, or a recovery status for the operation of the specific unmanned aircraft based on the particular weather conditions analyzed; and
one or more components configured to generate output data as a flight advisory from the flight condition evaluation that includes a mission compliance status confirming or denying compliance with the one or more operational rules for the operation of the specific unmanned aircraft and an operational instruction for the specific unmanned aircraft.

10. The system of claim 9, wherein the operational instruction is at least one of a fly instruction, a takeoff prevention instruction, a payload instruction, and a recovery interference prevention instruction.

11. The system of claim 9, wherein the data ingest and initialization component, the mission analytics components, and the one or more components configured to generate output data are performed by a device embedded on the specific unmanned aircraft.

12. The system of claim 9, further comprising a flight control component configured to restrict ground control of the specific unmanned aircraft in response to an operational instruction.

13. The system of claim 9, further comprising a flight control component configured to prevent an operator from preventing a return and landing using a predefined recovery path, in response to an operational instruction.

14. The system of claim 9, further comprising a flight certification module configured to confirm a flight certificate validity and deliver a signed authorization certificate for the specific unmanned aircraft to perform the particular mission.

15. The method of claim 9, wherein the output data includes one or more management advisory services from the flight condition evaluation, the one or more advisory services including a plurality of alerts that include at least one of an agricultural operations advisory and a regulatory advisory.

16. The system of claim 9, wherein the forecasted weather data includes weather forecasts for time periods coinciding with the performance of the particular mission.

17. The system of claim 9, wherein the flight condition is at least one of a pre-flight condition, an in-flight condition, and a post-flight condition.

18. A method of evaluating a flight condition for an unmanned aircraft, comprising:

retrieving and initializing a plurality of inputs, the plurality of inputs including weather information comprised of least one of current weather data, historical weather data, and forecasted weather data for a specific geographic area for a time period coinciding with performance of a particular mission, and including mission-specific flight parameters defining the performance of the particular mission by a specific unmanned aircraft at a specific time and including one or more of a payload, a flight plan, a craft type, and a geographical location of the particular mission;

retrieving one or more appropriate operational rules for operation of the specific unmanned aircraft in performing the particular mission based on the plurality of inputs;

evaluating a flight condition to determine a mission compliance status comprised of a proceed status, a do not proceed status, or a recovery status for the operation of the specific unmanned aircraft by applying one or more weather-based statistical analyses that compute mission risk probabilities based on an occurrence of both aircraft-based performance incidents and operator-based performance incidents during particular weather conditions using the weather information and the mission-specific flight parameters, to continually learn a significance of a plurality of variables affecting one or more previous missions that include weather variables, operator experience, aircraft parameters, and payload parameters, and impacting the performance of the particular mission, and assigning weights to each variable in the plurality of variables based on the learned significance and on the particular weather conditions in the weather-based statistical analysis for the performance of the particular mission to determine one or more outcomes for the one or more mission risk possibilities, and compare the one or more outcomes of the one or more weather-based statistical analyses to the one or more appropriate operational rules, information from a collection of the previous missions by the specific unmanned aircraft, and actuarial data related to one or both of the specific unmanned aircraft and an operator of the specific unmanned aircraft, in a mission risk assessment based on the particular weather conditions analyzed, the flight condition comprising at least one of a pre-flight condition, an in-flight condition, and a post-flight condition; and issuing a flight advisory representing the mission compliance status to at least one of an operator of the specific unmanned aircraft and to a device embedded on the specific unmanned aircraft.

19. The method of claim 18, further comprising adjusting a flight plan by modifying one or more of the mission-specific flight parameters in response to the mission compliance status.

20. The method of claim 18, further comprising confirming a validity of a flight certificate of mission authorization, and delivering a signed authorization certificate to conduct the particular mission.

21. The method of claim 18, wherein the advisory either confirms or denies compliance with the one or more operational rules for the particular mission.

22. The method of claim 18, wherein the advisory is an operational instruction for the specific unmanned aircraft, the operational instruction comprising at least one of a fly instruction, a takeoff prevention instruction, a payload instruction, and a recovery interference prevention instruction to prevent an operator from preventing the specific unmanned aircraft from returning and landing using a predefined recovery path.

23. The method of claim 18, further comprising issuing a management advisory service from the flight condition evaluation, the additional advisory service including a plurality of alerts that include at least one of an agricultural operations advisory and a regulatory advisory.

* * * * *